(12) United States Patent
Cuong

(10) Patent No.: US 8,671,675 B2
(45) Date of Patent: Mar. 18, 2014

(54) WAVE POWERED ELECTRIC GENERATOR SYSTEM

(76) Inventor: Nguyen Huu Cuong, Norwalk, CA (US)

(*) Notice: Subject to any disclaimer, the term of this patent is extended or adjusted under 35 U.S.C. 154(b) by 968 days.

(21) Appl. No.: 12/730,578

(22) Filed: Mar. 24, 2010

(65) Prior Publication Data

US 2010/0225116 A1   Sep. 9, 2010

Related U.S. Application Data

(60) Provisional application No. 61/163,574, filed on Mar. 26, 2009.

(51) Int. Cl.
*F03C 1/00* (2006.01)
*F03B 13/10* (2006.01)

(52) U.S. Cl.
USPC ............. 60/498; 60/499; 60/500; 60/505; 60/507; 290/42; 290/53

(58) Field of Classification Search
USPC .................. 60/497–507; 290/42, 53
See application file for complete search history.

(56) References Cited

U.S. PATENT DOCUMENTS

| | | | |
|---|---|---|---|
| 4,077,213 A | 3/1978 | Hagen | |
| 4,078,871 A | 3/1978 | Perkins, Jr. | |
| 4,258,269 A | 3/1981 | Tsubota | |
| 4,345,434 A | 8/1982 | Denyalkov | |
| 4,359,868 A | 11/1982 | Slonim | |
| 4,389,843 A * | 6/1983 | Lamberti | 60/507 |
| 4,412,417 A | 11/1983 | Dementhon | |
| 5,027,000 A | 6/1991 | Chino | |
| 6,226,989 B1 | 5/2001 | Fredriksson et al. | |
| 6,392,314 B1 | 5/2002 | Dick | |
| 6,681,572 B2 | 1/2004 | Flory | |
| 6,765,307 B2 | 7/2004 | Gerber et al. | |
| 6,772,592 B2 | 8/2004 | Gerber et al. | |
| 6,791,205 B2 | 9/2004 | Woodbridge | |
| 6,812,588 B1 | 11/2004 | Zadig | |
| 6,857,266 B2 | 2/2005 | Dick | |
| 7,199,481 B2 | 4/2007 | Hirsch | |
| 7,315,092 B2 | 1/2008 | Cook | |
| 7,808,120 B2 * | 10/2010 | Smith | 290/42 |
| 8,008,792 B2 * | 8/2011 | Gray | 290/42 |
| 8,143,736 B2 * | 3/2012 | Farb | 290/53 |
| 2007/0164568 A1 | 7/2007 | Greenspan et al. | |
| 2007/0200353 A1 | 8/2007 | Ottersen | |
| 2009/0066085 A1 | 3/2009 | Gray | |

FOREIGN PATENT DOCUMENTS

GB   2262572   6/1993
WO   94/15095   7/1994

* cited by examiner

*Primary Examiner* — Hoang Nguyen
(74) *Attorney, Agent, or Firm* — Nguyen Huu Nguyen

(57) ABSTRACT

In a wave powered electric generator system, multiple floatation devices are interconnected by torque arms arranged to convert pivotal movement of the torque arms due to up and down movement of the floatation devices, into one-way rotational movement of electric generator shafts, the torque arms being configured to permit expansion and contraction of their lengths when exposed to sudden, severe axial forces.

16 Claims, 6 Drawing Sheets

WAVE POWERED ELECTRIC GENERATOR SYSTEM

CROSS REFERENCE TO RELATED APPLICATIONS

This application claims the benefit of the Provisional Patent Application No. 61/163,574 filed in Mar. 26, 2009 and entitled TWIN POWER WAVE ENERGY CONVERSION and is incorporated herein in its entirety.

FIELD OF INVENTION

This invention relates to a renewable energy sources. In particular, it relates to devices extracting power from water waves, particularly ocean waves, and producing electric power.

BACKGROUND OF INVENTION

Wave energy is one of the renewal energy resources that deserves attention. Blowing wind and pressure fluctuations below the sea surface are the main reasons for causing waves. This wave motion could be harnessed to generate usable, energy that is clean and green.

SUMMARY OF THE INVENTION

According to the invention, there is provided a wave powered electric generator system, comprising at least three floatation devices arranged serially to each other to define outer floatation devices and at least one inner floatation device, a torque arm connected between each pair of adjacent floatation devices, wherein each said inner floatation device includes at least two rotatable shafts, each rotatable shaft being directly secured to one of the torque arms to convert pivotal motion of the torque arm to rotational movement of the shaft, a one-way transmission system that transmits one way rotational movement to an electrical generator shaft in response to pivotal motion of said torque arm in either direction.

The at least one inner floatation device includes at least one floatation member, e.g., a single floatation member with a first and a second rotatable shaft, the first and second rotatable shafts being secured to torque arms extending to the floatation member from opposite sides, or two floatation members connected to each other, each floatation member including a rotatable shaft secured to a torque arm.

Each torque arm preferably includes two sections connected by an axial force buffer that allows the two sections to move axially relative to each other. The axial force buffer may comprise a housing in which adjacent ends of the two sections of the torque arm are spaced apart in the housing and connected to at least one spring for buffering the axial movement of the two sections relative to each other.

The one-way transmission system may include at least one one-way clutch gear arranged to transmit rotary motion in one direction only, or may include a first one-way clutch gear arranged to transmit rotary motion only in a clockwise direction in response to a clockwise rotation imposed on said first one-way clutch gear and transmit no rotary motion in response to a counter-clockwise rotation imposed on said first one-way clutch gear, and a second one-way clutch gear arranged to transmit rotary motion in a counter-clockwise direction in response to a counter-clockwise rotation imposed on said second one-way clutch gear and transmit no rotary motion in response to a clockwise rotation imposed on said second one-way clutch gear. The first and second one-way clutch gears may be connected to the generator shaft through a gearing arrangement in which one of said first and second one-way clutch gears is connected to the generator shaft via one more gear than the other of said first and second one-way clutch gears, to ensure that the direction of rotation of the generator shaft is the same for the rotation provided by both of the clutch gears.

The outer floatation devices may include shafts for pivotally connecting to torque arms extending between the outer floatation devices and the at least one inner floatation device.

Each floatation device may comprise a plurality of members axially secured next to each other to define inwardly facing surfaces and outwardly facing surfaces with the shafts extending between the inwardly facing surfaces of said members, the torque arms being secured to the shafts at locations between said members. For example, the members may have a cylindrical configuration and are arranged axially next to each other with brackets securing the cylindrical members to each other.

For stability, the system may include stabilizer bars interconnecting the floatation devices along their outwardly facing surfaces so as to be pivotable relative to at least the inner floatation devices. Preferably each stabilizer bar includes two sections connected by an axial force buffer that allows the two sections to move axially relative to each other. The axial force buffer may comprise a housing in which adjacent ends of the two sections of the stabilizer bars are spaced apart in the housing and connected to at least one spring for buffering the axial movement of the two sections relative to each other.

DETAILED DESCRIPTION OF THE INVENTION

The exemplary embodiments described herein are for illustrative purposes only. The present invention is not limited to the particular floating wave power electric generating device as shown and described. It is understood that various omissions, substitutions or equivalents are contemplated, depending on the circumstances or requirements, and these are intended to be covered by the invention described herein without departing from the spirit or scope of the claims of the present invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The device of the present invention uses the up and down motion of the wave (e.g. ocean wave) to capture energy from that motion and convert it into useful energy (e.g. electricity).

Figure 1A:
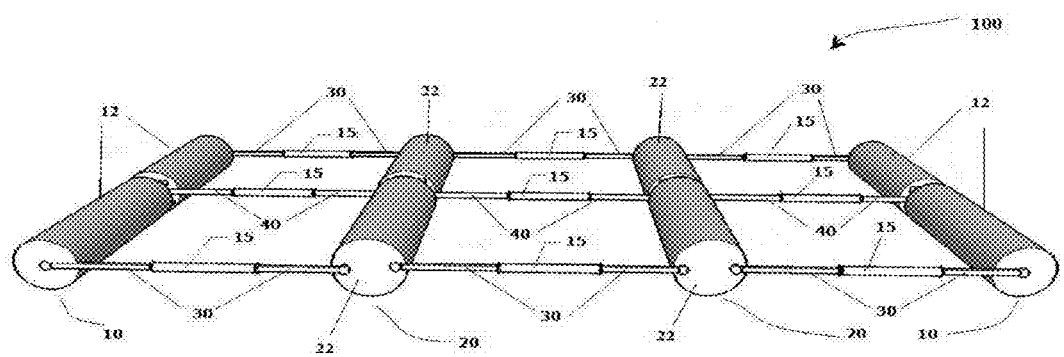
FIG. 1A is perspective view of a floating generator system, according to an embodiment of the present invention.
Figure 1B:
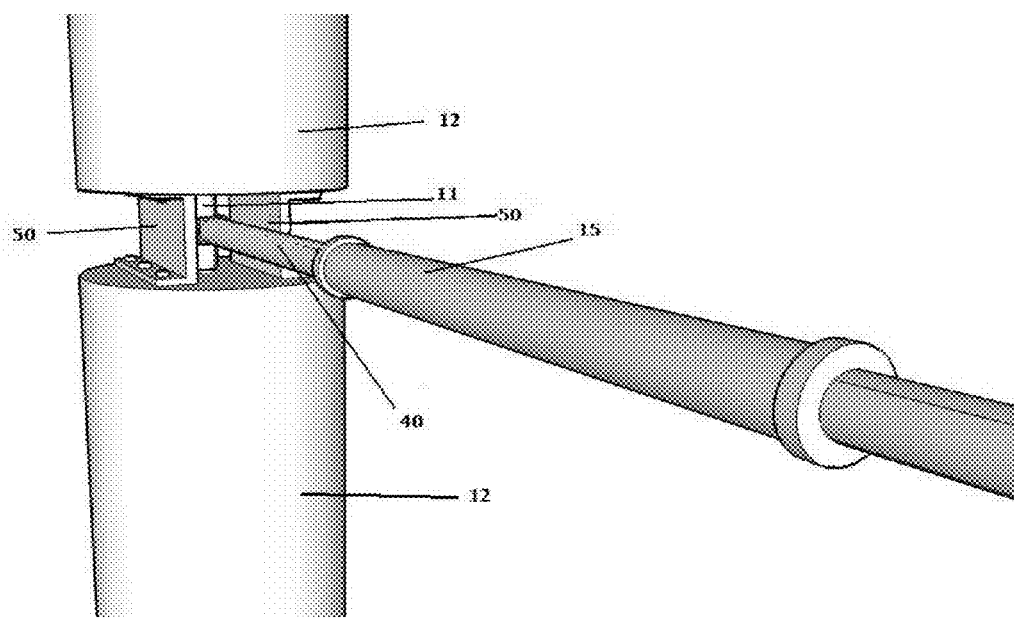
FIG. 1B is a side view of an outer portion of the system of FIG. 1A.
Figure 1C:
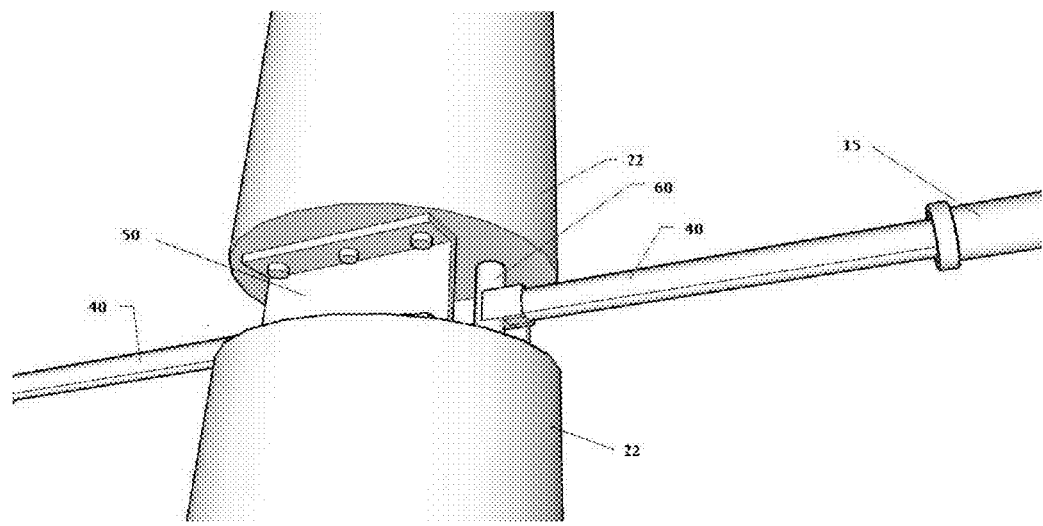
FIG. 1C is a side view of an inner portion of the system of FIG. 1A.

FIG. 1A illustrates an embodiment of a floating generator system 100 capable of generating energy. The system 100 comprises a plurality of floatation devices. The floatation devices are organized into two outer devices 10, and at least one inner device 20 placed between these two outer devices 10. In the embodiment of FIG. 1 two inner devices 20 are included. As shown in FIGS. 1B, C and D, each device, regardless of inner or outer, is formed by securely attaching one end of a floatation member 22, 12 to another of the same type by a pair of brackets 50. However, only the inner floatation members 22 contain within them the transmission system and the electric generator 90 connected thereto. Further differences between the inner and outer devices include the presence of an outer axle 11 between the outer members 12 (as shown in FIG. 1B), and of two driven axles 60 located between the inner members (as shown in FIGS. 1C and D). In FIGS. 1C and D, each driven axle 60 can interact directly with the transmission system to convert the motion of the waves into usable energy. While the floatation units shown in this embodiment are cylindrical in configuration, it will be appreciated that other shapes could be used, e.g., spherical floatation units.

Figure 1D:
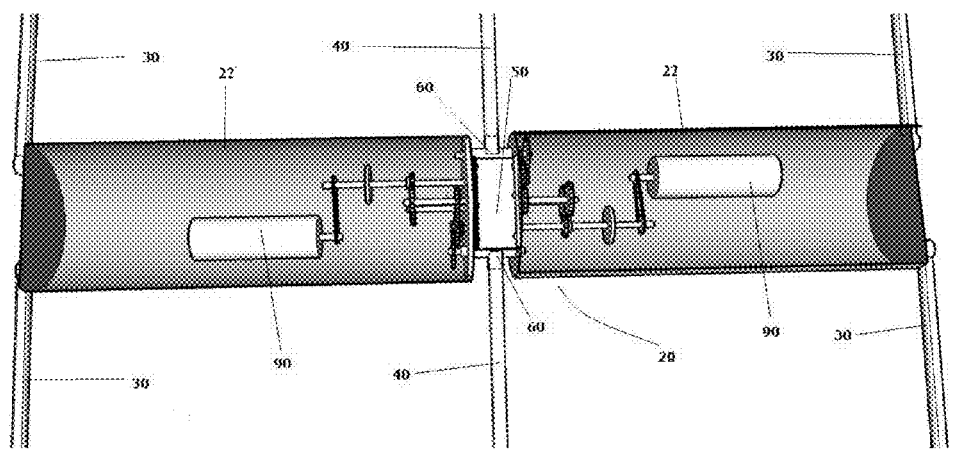
FIG. 1D is a cutaway view of the inner portion shown in FIG. 1C.

In FIG. 1A, on both sides of the floating system 100, the side interconnectors or stabilizer bars 30 are configured to pivotally attach all devices together. It will be appreciated, however, that pivotal movement need only be provided between the stabilizer bars and the inner devices 20. On the other hand, as shown in FIGS. 1B and 1C, the torque arm 40 is configured to rigidly attach at its one end to a rotatable shaft that defines a driven axle 60 of the inner device 20, and insofar as the other end of the torque arm 40 is connected to an outer device 10 having floatation members 12, it is connected in this embodiment to a free-wheeling shaft rotatably mounted to a location between the outer floatation members 12. In another embodiment the shaft may be non-rotatably secured to a location between the outer floatation members 12 and the torque arm can be rotatably mounted relative to such non-rotatable shaft. Insofar as the other end of the torque arm is connected to another inner device 20 having floatation members 22, it is securely attached to a rotatable shaft that defines the driven axle 60 located between said inner members 22. As illustrated by FIG. 1D, for any inner device 20, the torque arm 40 coming in from the left is configured to securely attach to the driven axle 60 on the left and the torque arm 40 coming out from the right is configured to securely attach to a driven axle 60 on the right. Thus, up and down pivoting of the torque arms will produce rotary motion in the driven axle 60 as will become clearer from the discussion below.

Figure 2:
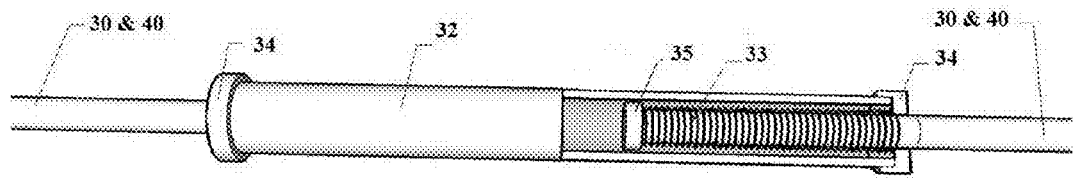
FIG. 2 is a cutaway view of one embodiment of a cylinder forming part of the system of the invention.

As illustrated in FIGS. 1A-D, between each set of adjacent side interconnectors 30 and torque arms 40, there is an axial force buffer in the form of a cylinder 15 that allows the lengths of the torque arms 40 and interconnectors 30 to change when an axial force is exerted on them. By being able to expand and contract the length between adjacent side interconnectors 30 and torque arms 40 automatically, the cylinder 15 insures the integrity and the survival of the floating system 100 during storm or bad weather which can cause rough waves, and allows for the maximum production of usable energy by being usable in any weather conditions. FIG. 2 illustrates the inner working of the cylinder 15. Within cylinder 15, side interconnector 30 or torque arm 40 does not extend straight through, but two separate rods are defined by the interconnectors or torque arms extending into the cylinder from opposite ends with a gap between the rods. A spring 33 is placed over each rod. For each rod a spring stopper 35 attaches to the end of the rod and prevents the spring 33 from sliding off the rod allowing the rod to slide freely back and forth and turn in cylinder 15. A cap 34 mounts at each end of the cylinder 15 to keep the spring 33 and the rod inside the cylinder. Whenever the waves cause the adjacent side interconnectors 30 or torque arms 40 to be pulled in different directions abruptly or violently, the rods in cylinder 15 can compress the springs 33 allowing the overall distance between the outer ends of the interconnectors 30 or torque arms 40 to increase, thereby accommodating the sudden changes. As soon as there is no more force pulling on the rods, the springs 33 snap back and retract the rods to their former positions in the cylinder. Typically the springs are chosen with a compressive force capability that takes account of the severity of the wave conditions in which the system is to be used. While the above embodiment had the axial force buffer mounted between two sections of the torque arms 40 and between two sections of the interconnectors 30, it will be appreciated that the torque arms and interconnectors could instead be defined by a single elongate member with a force buffer mounted at one of the ends. Also, since the purpose of the axial force buffer is to accommodate axial forces acting on the torque arms and interconnectors during rough sea conditions, any arrangement that allows the length of these members to change (either contract or extend) would work and need not require a pair of springs. A piston arrangement could be used instead or a single spring connected between the torque arm or interconnector sections or connected between one end of the torque arm or interconnector and the shaft to which it is connected could be used in other embodiments.

Figure 3A:
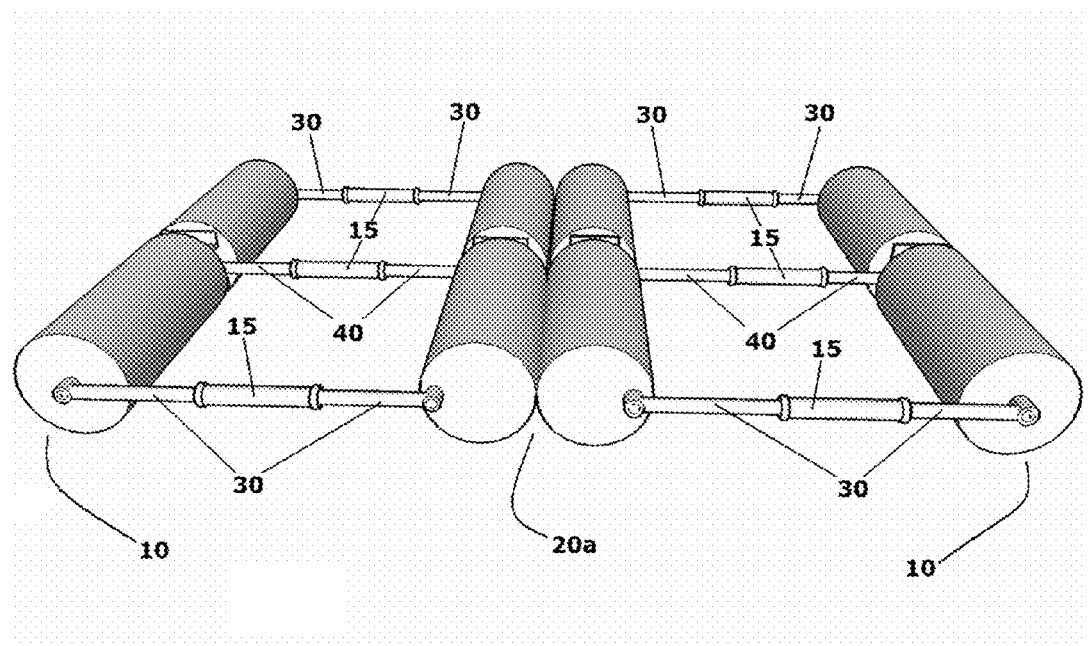
FIG. 3A is a perspective view of an alternative embodiment of a system of the invention.
Figure 3B:
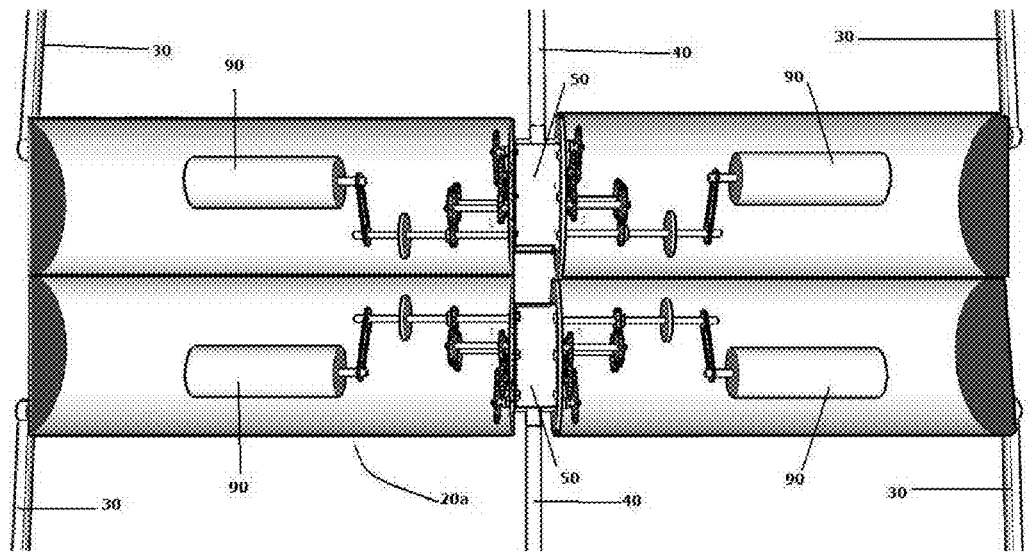
FIG. 3B is a cutaway view of inner portions of the alternative embodiment of FIG. 3A.

FIGS. 3A and B show another embodiment of this invention, in which the inner flotation device comprises two adjacent inner flotation members attaching on the sides to each other (20a). As such there is no torque arm 40 between them. In this specific configuration, because there is only one driven axle 60 attached to each inner flotation member, each member of the inner flotation device can only carry a maximum of one transmission system and one electric generator 90 within it. In contrast, in the specific configuration as shown in FIGS. 1A-D, because there are two driven axles 60 attached to each inner flotation member, each inner member can carry up to two transmission systems and two electric generators within it. It is desirable to distribute the weight of the floating system 100 evenly so that it is more stable floating on water. For example, if one were to use the configuration as shown in FIGS. 3A and B and to employ a transmission system and an electric generator in each of only two inner members, they should preferably be placed diagonally to each other in order to create a balanced distribution of weight.

Figure 4A:
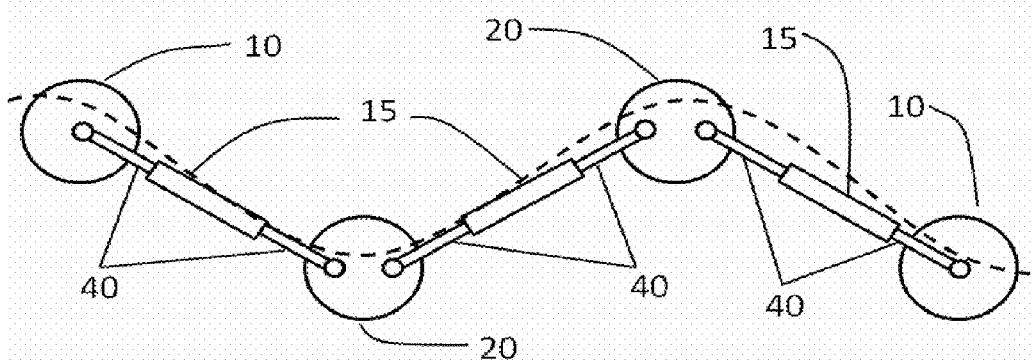
FIGS. 4A and B illustrate the movements of the torque arm of the system in response to the effects of the waves on the inner portions of the device of FIG. 1A.
Figure 4B:
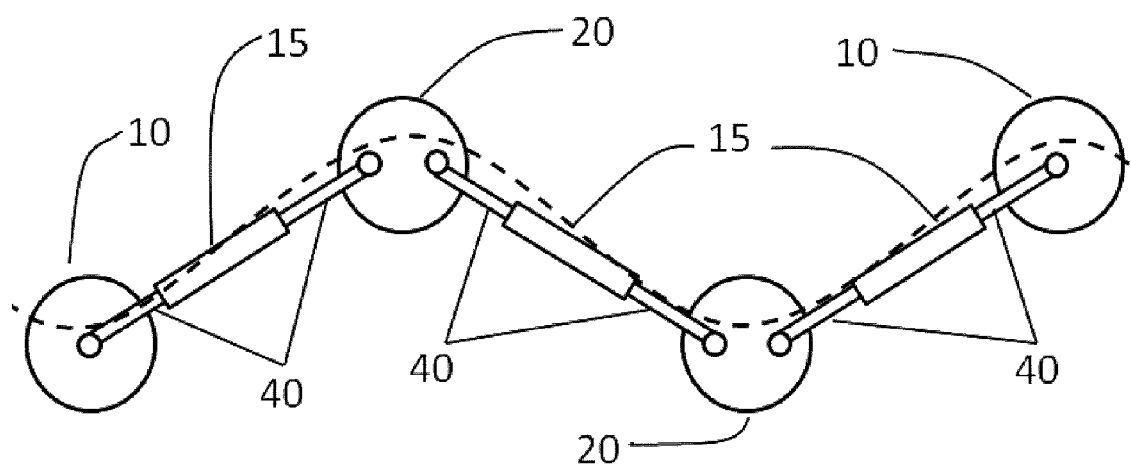

FIGS. 4A and B show the movements of the torque arm 40 and the driven axle 60 in response to the effects of the waves on the inner devices 20. If the wave causes the inner device 20 to be swung down to the valley of the wave (wave trough), the driven axle 60 on its left will rotate clockwise, while the driven axle 60 on its right will rotate counterclockwise. On the other hand, if the wave causes the inner device 20 to be swung up to the top of the wave (wave crest), the driven axle 60 on its left will rotate counterclockwise, while the driven axle 60 on its right will rotate clockwise. Each rotation, whether clockwise or counterclockwise, will engage the transmission system and in turn, will produce electricity through the electric generator 90.

Figure 5:
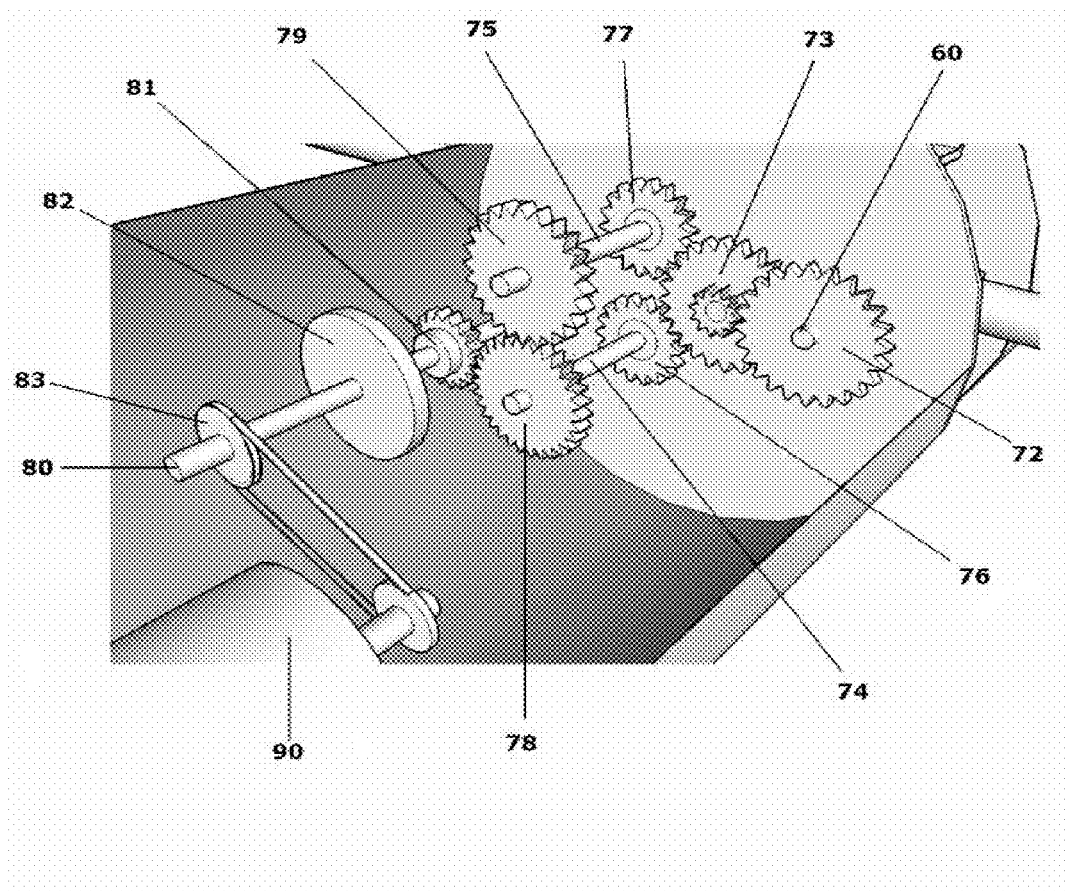
FIG. 5 illustrates a transmission system which converts the rotary motion of the driven axle of one embodiment of the invention into usable energy.

The one-way transmission system is shown in detail in FIG. 5. A primary gear 72 is mounted on one end of the driven axle 60 and configured to integrally rotate with it. The double gear 73 contains a small gear affixed to a big gear. The primary gear 72 is capable of meshing with the small gear in such a way that when the primary gear 72 is rotated, it, in turn, rotates the small gear of the double gear 73. The small gear will transmit the rotary motion it receives into a higher speed rotation through the rotation of the big gear of the double gear 73. The direction of the rotation of the big gear of the double gear 73 will dictate what other gears in the transmission system will rotate in turn. For example, when the big gear of the double gear 73 rotates clockwise, it will only engage the first one-way clutch gear 77 on shaft 75 and thus, shaft 75 will rotate counter-clockwise. The rotation of shaft 75 causes the first large gear 79 mounted on shaft 75 to rotate. The first large gear 79 on shaft 75 is capable of meshing with the second large gear 78 on shaft 74 to transmit the rotary motion in such a manner that the rotation of shaft 75 is always opposite to the rotation of shaft 74. The rotation of the second large gear 78 on shaft 74 is therefore clockwise and, in turn, rotates the torque limiting clutch gear 81 located on the flywheel shaft 80 in a counter-clockwise direction. The torque limiting clutch gear 81 interacts with the flywheel shaft 80 in such a way that when the torque on the torque limiting clutch gear 81 reaches a certain limit, the torque limiting clutch gear 81 slips or disengages the flywheel shaft 80 to prevent it from over-rotating and thereby cause damage to the electric generator 90. Also, mounted on the flywheel shaft 80 is the flywheel 82 designed to improve energy production, and the driving mechanism 83 for transmitting the rotary motion of the flywheel shaft to the electric generator 90. When the flywheel shaft 80 rotates, the driving mechanism 83 will engage the electric generator 90 and produce electricity.

On the other hand, if the big gear of the double gear 73 rotates counterclockwise, it will only engage the second one-way clutch gear 76 on shaft 74, and thus shaft 74 will rotate clockwise. The rotation of shaft 74 will cause the rotation of the second large gear 78 in a clockwise direction, and thus again produce counter-clockwise rotation of the torque limiting clutch gear 81, the flywheel shaft 80, the flywheel 82, and the driving mechanism 83, and produce electricity through the electric generator 90.

While the invention was discussed with reference to two specific examples, as mentioned above, the invention is not so limited and includes other embodiments as defined by the claims without departing from the scope of the invention.

What is claimed is:

1. A wave powered electric generator system, comprising at least three floatation devices arranged serially to each other to define two outer floatation devices and at least one inner floatation device, a torque arm connected between each pair of adjacent floatation devices, wherein each said inner floatation device includes at least two rotatable shafts, each said rotatable shaft being directly secured to one of said torque arms to convert pivotal motion of the torque arm to rotational movement of the shaft, a one-way transmission system that transmits one way rotational movement to an electrical generator in response to pivotal motion of said torque arm in either direction.

2. A system of claim 1, wherein each said inner floatation device includes one or more single floatation member.

3. A system of claim 1, wherein each said inner floatation device comprises two adjacent floatation members connecting to each other.

4. A system of claim 1, wherein each torque arm includes two sections connected by the axial force buffer that allows the two sections to move axially relative to each other.

5. A system of claim 4, wherein the axial force buffer comprises a housing in which adjacent ends of the two sections of the torque arm are spaced apart in the housing and connected to at least one spring for buffering the axial movement of the two sections relative to each other.

6. A system of claim 1, wherein the one-way transmission system includes at least one one-way clutch gear arranged to transmit rotary motion in one direction only.

7. A system of claim 1, wherein the one-way transmission system includes a first one-way clutch gear arranged to transmit rotary motion only in a clockwise direction in response to a clockwise rotation imposed on said first one-way clutch gear and transmit no rotary motion in response to a counter-clockwise rotation imposed on said first one-way clutch gear, and a second one-way clutch gear arranged to transmit rotary motion in a counter-clockwise direction in response to a counter-clockwise rotation imposed on said second one-way clutch gear and transmit no rotary motion in response to a clockwise rotation imposed on said second one-way clutch gear.

8. A system of claim 7 wherein the first and second one-way clutch gears are connected to the generator through a gearing arrangement in which one of said first and second one-way clutch gears is connected to the generator via one more gear than the other of said first and second one-way clutch gears, to ensure that the direction of rotation transmits to the generator is the same for the rotation provided by both of the clutch gears.

9. A system of claim 1, wherein the outer floatation devices include shafts for pivotally connecting to torque arms extending between the outer floatation devices and said inner floatation device.

10. A system of claim 9, wherein each floatation device comprises a plurality of members axially secured next to each other to define inwardly facing surfaces and outwardly facing surfaces with the shafts extending between the inwardly facing surfaces of said members, the torque arms being secured to the shafts at locations between said members.

11. A system of claim 10, wherein the members have a cylindrical configuration and are arranged axially next to each other with brackets securing said members to each other.

12. A system of claim 10, further comprising stabilizer bars inter-connecting the floatation devices along their outermost outwardly facing surfaces so as to be pivotable relative to said inner floatation devices.

13. A system of claim 12, wherein each stabilizer bar includes two sections connected by an axial force buffer that allows the two sections to move axially relative to each other.

14. A system of claim 13, wherein the axial force buffer comprises a housing in which adjacent ends of the two sections of the stabilizer bars are spaced apart in the housing and connected to at least one spring for buffering the axial movement of the two sections relative to each other.

15. A system of claim 6, wherein the at least one one-way clutch gear is connected to a torque limiting clutch gear for preventing damages to the generator.

16. A system of claim 6, wherein the one-way transmission system further includes a flywheel.

* * * * *